(12) United States Patent
Hascoët et al.

(10) Patent No.: US 11,992,873 B2
(45) Date of Patent: May 28, 2024

(54) METHOD AND DEVICE FOR ADDITIVE MANUFACTURING BY AGGLOMERATION OF A GRANULAR MATERIAL

(71) Applicant: ECOLE CENTRALE DE NANTES, Nantes (FR)

(72) Inventors: Jean-Yves Hascoët, Nantes (FR); Pascal Mognol, Rennes (FR); Tugdual Le Néel, Nantes (FR)

(73) Assignee: ECOLE CENTRALE DE NANTES, Nantes (FR)

( * ) Notice: Subject to any disclaimer, the term of this patent is extended or adjusted under 35 U.S.C. 154(b) by 635 days.

(21) Appl. No.: 17/624,235

(22) PCT Filed: Jul. 8, 2019

(86) PCT No.: PCT/EP2019/068306
§ 371 (c)(1),
(2) Date: Dec. 30, 2021

(87) PCT Pub. No.: WO2020/011734
PCT Pub. Date: Jan. 16, 2020

(65) Prior Publication Data
US 2022/0347739 A1  Nov. 3, 2022

(30) Foreign Application Priority Data
Jul. 7, 2018 (FR) .......................... 1870818

(51) Int. Cl.
*B22C 1/18* (2006.01)
*B22C 1/02* (2006.01)
(Continued)

(52) U.S. Cl.
CPC ............... *B22C 1/188* (2013.01); *B22C 1/02* (2013.01); *B22C 1/162* (2013.01); *B22C 5/00* (2013.01);
(Continued)

(58) Field of Classification Search
CPC ........... B33Y 10/00; B33Y 30/00; B22C 1/02; B22C 1/188; B22C 9/02; B22D 29/06
See application file for complete search history.

(56) References Cited

U.S. PATENT DOCUMENTS 6,596,224 B1 * 7/2003 Sachs ..................... B29C 64/112
425/84
8,741,194 B1 * 6/2014 Ederer .................... B22C 1/162
264/236
(Continued)

FOREIGN PATENT DOCUMENTS

CA        3063511 A1 * 12/2018 ............. B22C 1/224
CN    106363128 A  *  2/2017 ............... B22C 9/02
(Continued)

*Primary Examiner* — Kevin E Yoon
(74) *Attorney, Agent, or Firm* — H&I PARTNERS; C. Andrew Im; Chai Im

(57) ABSTRACT

A method for manufacturing a structure from a granular material, called sand, in particular a mold. A layer of sand is deposited. The layer of sand is selectively agglomerated by spraying, using a spray nozzle, an inorganic binder having an M2SiO3 type (meta)silicate dissolved in a solvent. Prior to the spraying, the inorganic binder is heated to a temperature to confer on it a viscosity less than 0.2 Pa·s. A device for implementing the method is provided.

11 Claims, 4 Drawing Sheets

(51) Int. Cl.
  *B22C 1/16* (2006.01)
  *B22C 5/00* (2006.01)
  *B22C 9/02* (2006.01)
  *B22C 19/02* (2006.01)
  *B22C 19/04* (2006.01)
  B33Y 10/00 (2015.01)
  B33Y 30/00 (2015.01)
  *B33Y 70/00* (2020.01)

(52) U.S. Cl.
  CPC ............... *B22C 9/02* (2013.01); *B22C 19/02* (2013.01); *B22C 19/04* (2013.01); *B33Y 10/00* (2014.12); *B33Y 30/00* (2014.12); *B33Y 70/00* (2014.12)

(56) References Cited

U.S. PATENT DOCUMENTS

| | | |
|---|---|---|
| 2003/0133822 A1 | 7/2003 | Harryson |
| 2011/0108232 A1 | 5/2011 | Cannon et al. |
| 2014/0212677 A1 | 7/2014 | Gnuchtel et al. |
| 2015/0139849 A1 | 5/2015 | Pialot et al. |
| 2015/0258744 A1 | 9/2015 | Muller et al. |
| 2016/0185009 A1 | 6/2016 | Keshavan et al. |
| 2017/0320128 A1 | 11/2017 | Deters et al. |
| 2018/0036945 A1 | 2/2018 | Lereboullet et al. |

FOREIGN PATENT DOCUMENTS

| | | | | |
|---|---|---|---|---|
| CN | 105945243 B | * | 11/2017 | |
| CN | 107790628 A | | 3/2018 | |
| EP | 0431924 B1 | | 1/1996 | |
| EP | 3040136 A1 | | 7/2016 | |
| WO | WO-2019113412 A1 | * | 6/2019 | ............. B22F 10/14 |

* cited by examiner

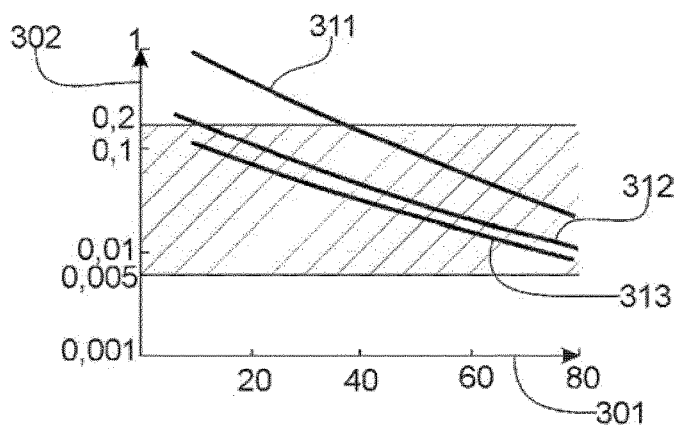
FIG. 3
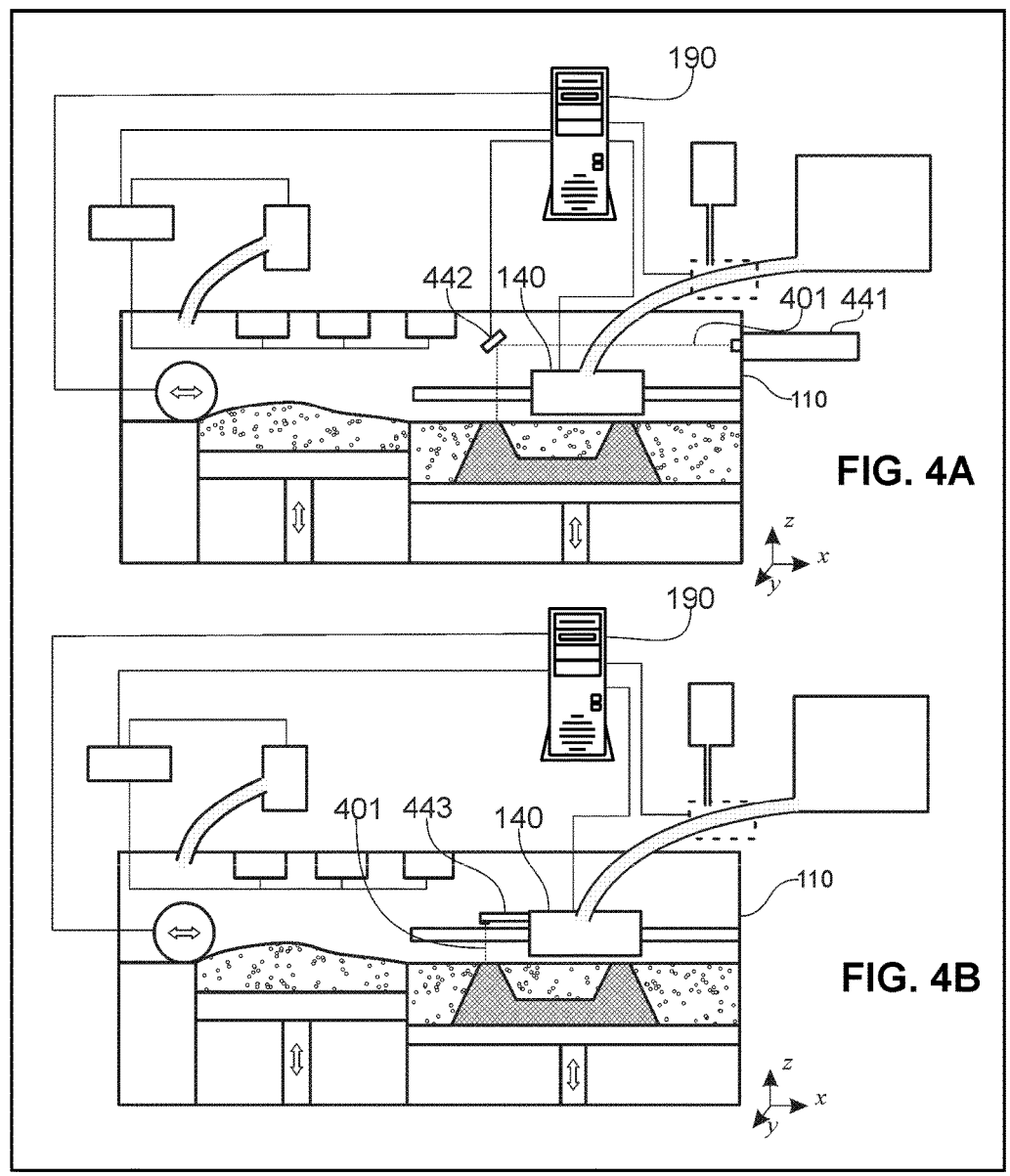
FIG. 4
FIG. 4A
FIG. 4B

METHOD AND DEVICE FOR ADDITIVE MANUFACTURING BY AGGLOMERATION OF A GRANULAR MATERIAL

RELATED APPLICATION

This application is a § 371 application of PCT/EP2019/068306 filed Jul. 8, 2019, which is incorporated herein by reference in its entirety.

TECHNICAL FIELD

The invention pertains to a method and a device for additive manufacturing by agglomeration of a granular material. The invention applies, in particular, but not exclusively, to the field of casting, for the manufacturing molds, dies and cores, without using a physical model that is made of wood, wax, alloy or polymer.

BACKGROUND OF THE INVENTION

Document EP0431924B1 describes an additive manufacturing method, wherein a binder is sprayed according to a specific path on a layer of granular material. The grains of the layer on which the binder has been sprayed are agglomerated while the other grains remain free. The binder is a resin or an inorganic binder in the form of a silicate-based colloidal suspension. By repeating the operation on several layers deposited in strata, the method allows to produce a part from a granular material.

The disadvantage of this technique of the prior art and its more recent derivatives, is to require for its implementation, a binder of low viscosity to allow it both to flow through the printing head and to impregnate the zone on which it is sprayed. Yet, it is difficult to obtain a colloidal suspension of non-organic binder which has both a low viscosity and contains a quantity of binder sufficient to obtain a rapid agglomeration of particles of the layer of sand, such that the devices which are commercially available use, in practice, organic resins of low viscosity like binders, typically around 0.005 to 0.2 Pas.

Document US 2014/0212677A1 describes a method for manufacturing a mold by additive manufacturing, wherein the selective agglomeration is done from a powder, obtained by dry spraying, of a silicate alkaline solution which acts as a binder. Said particles of the silicate alkaline solution are either added to the sand or deposited on the layer of sand before carrying out selective agglomeration. This selective agglomeration is done by spraying water according to a determined path. The water dissolves the binder which agglomerates the grains, a natural or accelerated drying is then necessary to achieve the setting. The difficulty of implementing this method resides in particular, in controlling the zone affected by the binder activation, i.e., the zone put into contact with the water. The binder being incorporated to the sand, or sprayed beforehand on it, a zone larger than that targeted is easily affected by the process, which involves adding, in addition to the sand, hydraulic binders able to confine the water in the zone scanned by the printing head.

Document US 2017/0320128A1 describes a selective agglomeration method of a granular material, by the spraying of an inorganic binder with low viscosity at 25° C.

Document US 2011/0108232A1 describes a selective agglomeration method of a granular material by an organic binder comprising collagen.

OBJECT AND SUMMARY OF THE INVENTION

A sand mold is a single-use mold, comprising an imprint and possibly cores which reproduce, in inverse volume, the shape of the molded part. According to traditional techniques, the mold is obtained by compacting a granular refractory material, called sand, around a model for the imprint, or in a model, called core box, for the cores. Once the imprint is obtained, the model is removed from the mold, either by opening the mold according to one or more parting planes, or by destroying the model before or during casting. The model is obtained by manual molding, by machining or also by additive manufacturing.

Outside of the shape which molds the molded part, the mold comprises other arrangements such as casting holes, or vent holes obtained in the same way as the imprint.

In order to set the shape of the mold and to harden the surface of the imprint, an additive is frequently added to the sand, generally a thermosetting resin, and hardened by cooking or by chemical means. During casting, the contact of the resin with the molten metal leads to the emission of carbon dioxide, which poses environmental issues, but which is also likely to create defects in the molded parts. Although there are inorganic binders, these are hardly used. The hardening provided by the binder must be sufficient to stabilize the imprint, but at the same time, preserving enough brittleness in the structure, to allow an easy release, without risking damaging the molded part. Finally, one of the aims is also to be able to preserve the possibilities for recycling the sand.

The aim of the invention is to propose a device and a method for manufacturing a sand structure, in particular a mold, by additive manufacturing, without using a model and which solves the disadvantages of the prior art linked to the use of organic binders, while being compatible with the molding of a material with a high melting point such as a ferro-graphite cast iron, by preserving the ability of demolding the part, in particular automated demolding.

Another aim of the invention, is to create a part from an agglomerated granular material, the physicochemical properties of which are variable according to different directions in the part.

In the whole text, the term "sand" means a granular material able to be compacted/agglomerated to form a defined shape.

The invention aims to solve the disadvantages of the prior art and pertains to this end, to a method for manufacturing a structure from a granular material, called sand, in particular a mold, said manufacturing comprising an additive manufacturing phase, comprising the steps of:
  i. depositing a layer of sand;
  ii. selectively agglomerating the layer of sand by spraying, by means of a printing head, of an inorganic binder comprising an $M_2SiO_3$ type (meta)silicate dissolved in a solvent, wherein the inorganic binder is heated prior to its spraying at a temperature able to confer to it a viscosity lower than 0.2 Pa·s.

Thus, by mixing the (meta)silicate with a solvent, in particular water, so as to form a liquid glass, and by heating said liquid glass before its spraying, the viscosity is adapted to the spraying by a nozzle or printing head, while ensuring a good selective impregnation of the zone to be agglomerated. Controlling the viscosity of the organic binder also allows to add to it specific additives, in particular to vary the properties of the agglomerated zone, while preserving a viscosity adapted to the spraying and to the agglomeration.

The invention is advantageously implemented according to the embodiments and variants outlined below, which are to be considered individually or according to any technically possible combination.

Advantageously, M is selected from Na, K and Li individually or in combination.

The quantity of (meta)silicate in the inorganic binder is comprised between 5% and 90%, preferably between 10% and 40%.

According to one particular embodiment, the inorganic binder comprises additives in the form of pigments or nanoparticles. This embodiment allows to modify the properties of the zone agglomerated by the additives.

Advantageously, M is Na and the proportion of sodium silicate in the inorganic binder is equal to 30%. $Na_2SiO_3$ is particularly advantageous because of its low cost. A proportion of 30% allows to reach a viscosity adapted to the implementation of the method.

Advantageously, the solvent is water.

Advantageously, the of the invention comprises after step ii), a step of:
iii. drying the zone affected by the spraying of the binder.
Thus, the setting of the binder is quicker, as well as the time for producing the mold.

According to an embodiment, the drying is obtained by heating.

According to variants of this embodiment, the heating is located at the level of the zone of spraying of the binder or applied to the whole structure during or subsequent to the additive manufacturing phase.

According to another embodiment, the drying is obtained by putting the zone affected by the spraying of the binder in contact with $CO_2$.

According to an embodiment of the method of the invention, step i) is carried out by means of a hopper moved at a constant speed and it comprises a step consisting after step ii) of depositing a layer of granular material of characteristics different from that deposited during the carrying out of preceding step i). This embodiment allows to create variations of properties in the thickness of the part, in particular to adapt it to the stresses that it undergoes during its use, or to impact the flow or cooling speed of the material cast in the case of using the part obtained as a mold.

According to one embodiment, the method of the invention comprises after step ii) or after step iii), a step of:
iv. extracting the agglomerated substrate from the sand bed,
and advantageously this step comprises the injection of a gas under the sand bed in order to fluidify the non-agglomerated part of said sand bed. Thus, the agglomerated structure is easily removed from the sand bed.

The invention also pertains to a device for implementing the method of the invention according to any of its embodiments, the device comprising:
retention means, adapted to contain a sand bed;
a spray nozzle adapted to spray the inorganic binder on a defined zone of the sand bed;
control means for the relative motion of the nozzle with respect to the sand bed;
means for depositing a layer of sand in the retention means;
means for heating the inorganic binder before its spraying by the nozzle.

According to a first embodiment of the device of the invention, the inorganic binder is contained in a heated container.

According to a second embodiment, compatible with the preceding one, the means for heating the organic binder of the device of the invention, comprise means for heating said binder during its passage into the spray nozzle or its transport from the reservoir to the spray nozzle.

It is thus possible to heat the binder to a temperature adapted to a desired effect during the spraying on the sand bed.

Advantageously, the device of the invention comprises:
a heating means comprising a laser beam, focused on a zone exposed to the spraying of the binder.

Thus, the binder is dried immediately after its spraying, which ensures the stability of the sections thus made.

Advantageously, the device of the invention comprises a chamber to confine the atmosphere surrounding the sand in the retention means. Thus, the setting conditions of the binder are optimized by acting in particular on the composition of the atmosphere, its hygrometry, or on its temperature.

Advantageously, the device of the invention, comprises, according to the latter embodiment, means for controlling the $CO_2$ content of the atmosphere contained in the chamber.

Thus, according to the embodiment variants, the setting of the binder is accelerated by enriching the atmosphere with $CO_2$ in the chamber, or slowed down by reducing said $CO_2$ content, so as to avoid, for example, the clogging of the nozzles during the spraying of the binder.

Advantageously, the table of retention means of the device of the invention comprises a plurality of holes for spraying a gas under the sand bed. Thus, after making the structure by selective agglomeration, the latter is easily removed from the non-agglomerated sand bed, without risking degradation of it, in particular in an automated manner, by the fluidification effect of the sand bed obtained by injecting the gas.

According to one particular embodiment, the retention means, are created in the sand bed by a selective agglomeration done according to the method of the invention.

According to an embodiment of the device of the invention, it comprises a discharge hopper with a variable opening. This embodiment allows a precise control of the thickness of the layer of sand deposited.

The method and the device of the invention are advantageously used to produce a part with variable physicochemical properties according to different directions in the part. This possibility opens up new perspectives in the design and the production of parts, in particular molds.

BRIEF DESCRIPTION OF THE DRAWINGS

The invention is disclosed below according to its preferred embodiments, not at all limiting, and in reference to FIGS. 1 to 8, wherein:

FIG. 3 is an example of an evolution of viscosity of an inorganic binder according to the temperature and its concentration of (meta)silicates in a semi-logarithmic diagram;

FIG. 4 represents, according to the same views as FIG. 1, embodiment examples of the of the invention comprising localized heating means, of the zone exposed to the spraying of inorganic binder, FIG. 4A with means for generating a fixed laser beam, FIG. 4B with means for generating a mobile laser beam;

DETAILED DESCRIPTION OF THE EMBODIMENTS

Figure 1:
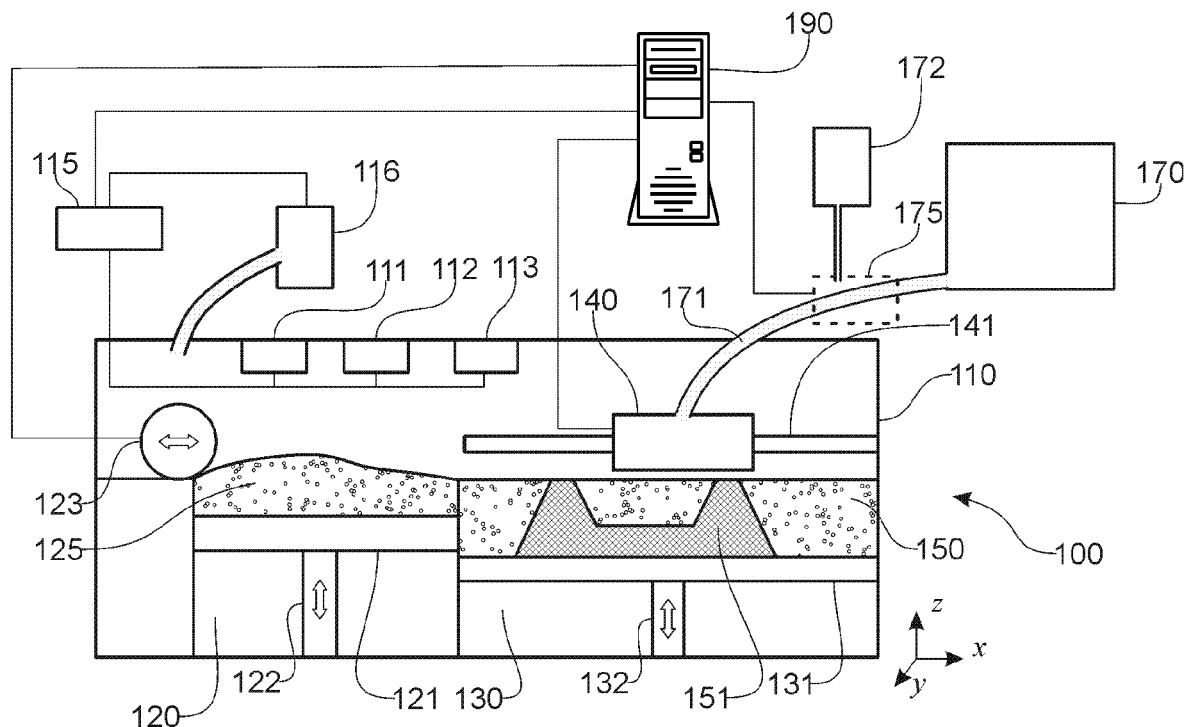
FIG. 1 represents, according to a cross-sectional, schematic view, an exemplary embodiment of the device of the invention.

FIG. 1, according to an exemplary embodiment, the device (100) of the invention comprises a closed chamber (110) containing a controlled atmosphere in particular in terms of composition and temperature.

A plurality of sensors, placed in said chamber, allows to measure, for example, its temperature (111), hygrometry (112) and the ratio of $CO_2$ (113). The nature of the atmosphere in the chamber is determined by the nature of the sand used and the nature of the inorganic binder, so as to ensure an easy spreading of the sand and its rapid agglomeration in the zones put into contact with the inorganic binder.

As an example, the atmosphere comprised in the chamber comprises 60% humidity and is brought to 20° C. for a $CO_2$ content of around 0.04%.

These conditions are used for the implementation of the method of the invention with an inorganic binder of $Na_2SiO_3$ type.

According to another embodiment, the temperature of the chamber is brought to a temperature of 80° C. to accelerate the drying of the structure during its manufacture.

According to another example, the atmosphere contained in the chamber (110) is enriched with a $CO_2$ content greater than 0.04% in order to accelerate the setting of the inorganic binder during its spraying.

According to another exemplary embodiment, the $CO_2$ content of the atmosphere contained in the chamber, is deprived of $CO_2$, at a content less than 0.04%, so as to avoid the clogging of the spray nozzles by the binder.

Thus, by acting on the parameters such as the hygrometry, the temperature and the $CO_2$ content in the closed chamber (110), the device and the method of the invention allow to finely adjust the setting or drying conditions of the binder in accordance with the manufactured structure and to the nature of the sand.

To this end, the parameters relating to the atmosphere in the chamber being determined, the information coming from the sensors (111, 112, 113) placed in said chamber, are used by an electronic module (115) which controls a module (116) for controlling the atmosphere so as to maintain the corresponding parameters in the desired ranges.

Inside the chamber, according to an embodiment example, a first container (120) comprises a material reserve, in the form of a pile of sand (125) placed on a mobile plate (121) which can be moved vertically by means of an actuator (122), i.e., parallel to the z axis of FIG. 1.

A second container (130) called retention container, comprises a table (131) and means (132) for moving vertically said table, for example a ball screw system or a linear motor.

These means support the structure(s) (151) during the manufacturing and the sand bed (150) from which said structure(s) (151) are made.

Said structure (151) is created by successive layers, by selectively agglomerating the sand grains in a layer of defined thickness, deposited beforehand.

To this end, one or more controlled scrapers (123) allow to transfer some of the pile of sand (125) comprised in the first container (120) to the retention container (130) according to a substantially uniform layer of thickness.

To do this, according to this embodiment example, the table (131) of the retention container is descended (in the direction of negative z's according to FIG. 1) by a height corresponding to the desired thickness of the layer of sand. The mobile plate (121) of the first container is itself moved upwards (in the direction of the positive z's according to FIG. 1) by a value substantially equal to the thickness of the layer, preferably slightly greater. Then, the scraper(s) (123) are moved towards the retention container (direction of the positive x's according to FIG. 1) to transfer a layer of sand of substantially uniform thickness, either on the table (131) of the retention container, during the creation of the first layer, or on the sand bed (151) already there in this container during manufacturing. Upon their return to the first container (direction of negative x's according to FIG. 1), the scraper(s) (123) equalize the thickness of the layer of sand thus transferred, bringing the possible excess thickness of sand back into the first container.

The layer of sand being deposited, the sand comprised in said layer is selectively agglomerated by a spraying assembly (140), supported by guiding means (141) and movement according to at least 2 axes, for example x and y according to FIG. 1, and the motions of which according to these axes, are controlled by a numerical control director (190).

The spraying assembly (140) comprises one or more spray nozzles comprising solenoid valves also controlled by the numerical control director (190), which nozzles spray on the sand bed (150) an inorganic binder contained in liquid form in a reservoir (170).

Thus, the flow in each nozzle of the spraying assembly is controlled by the numerical control director. According to alternative embodiments, all the nozzles of the spraying assembly are identical, or the spraying assembly comprises different nozzles, corresponding to different jet precisions, or adapted to the spraying of different types of inorganic binder.

Advantageously, the spraying assembly allows the mounting of different types of nozzles in each place provided for this purpose.

According to this embodiment example, the reservoir (170) is placed outside of the chamber and the inorganic binder is conveyed towards the spraying assembly (140) by means of a conduit (171). Alternatively, the reservoir is placed inside the chamber or forms an integral part of the spraying assembly. Also, according to another embodiment, the device comprises an external reservoir and a buffer reservoir at the level of the spraying assembly.

The inorganic binder is advantageously a solution of one or more (meta)silicates in water. The proportion of (meta) silicates is selected according to the nature of the sand, to the targeted setting time and to the viscosity of the inorganic binder such that it is compatible with the passage diameter of the nozzles of the spraying assembly, and subsequently, to the precision of the targeted selective agglomeration. Typically, the proportion of (meta)silicate is comprised between 10% and 40%.

According to a preferred embodiment, the (meta)silicate is a sodium silicate, for example $Na_2SiO_3$, with a proportion of 30% of sodium silicate per 70% of water, in weight percentages, in the inorganic binder. Alternatively or complementarily, the inorganic binder comprises a lithium silicate or a cobalt silicate. According to particular embodiments, the inorganic binder comprises additives, for example pigments or nanoparticles, for example in colloidal suspension in said inorganic binder. These additives, in particular nanoparticles, allow to modify the mechanical properties of the agglomerated zones constituting the structure (151), in particular increasing its hardness or stability at a high temperature, or also plasticity. Said additives, in particular nanoparticles, also allow to functionalize the surface or the assembly of the structure (151) thus produced, by conferring to it particular properties, in particular optical or electrical, such as an electrical conductivity or semi-conductivity, or also magnetic or thermal properties, without these examples being limiting.

Thus, the additives allow to adjust, for example, the thermal properties of the structure obtained by the method of the invention, by conferring to it conduction, radiation or thermal effusivity properties, adapted to the molding operations carried out from this structure, in particular according to the nature of the molded material, or also, to make said structure compatible, in particular on the surface, with techniques for heating the mold by electromagnetic induction or microwave induction.

According to embodiment examples, said properties are achieved on the part, directly from the implementation of the additive manufacturing method of the invention, or after the part thus obtained has undergone an additional chemical, thermal or electrical treatment.

According to other embodiments, compatible with the preceding ones, additives such as salts, for instance NaCl or KCl, are added to the solution, in order to modify its rheological behavior, more specifically, the evolution of its viscosity with the temperature, or also polymers, in order to better control the consistency of the jet exiting the spray nozzles.

According to another embodiment, additives are added to the inorganic binder solution in order to modify its wetting or capillarity diffusion properties in the sand bed.

Thus, according to one particular embodiment, the device of the invention comprises a second reservoir (172) comprising additives and a mixing module (175) comprising dosing and homogenization means, controlled by the numerical control director (190), so as to control the quantity of additive in the inorganic binder dispensed to the spraying assembly (140).

This embodiment allows in particular, to vary the proportion of additive along the path of the spraying assembly, to obtain gradients of properties in the structure (151), or different properties in the core and on the surface of the structure.

Thus, as a non-limiting example, the structure comprises a molding surface the surface of which is made sensitive to heating by electromagnetic radiation, by a greater additive content, while the remainder of the structure is transparent to such an electromagnetic radiation.

According to another embodiment possibly combined with the latter, the method and the device of the invention also allow vary the properties of the granular material deposited on each layer and thus, whether through its nature or its grain size, to obtain variations of mechanical, thermal, electrical or tribological properties, without this list being limiting, in the different dimensions of the part thus made.

The binder being selectively sprayed on the deposited layer of sand, it dries quickly, naturally or, for example, due to the temperature imposed in the chamber, or to the atmosphere enriched with $CO_2$ in said chamber (110), thus agglomerating the grains in the thickness of the layer in the area where said binder has been sprayed, if necessary, with the zones already agglomerated during the preceding passage. Thus, the structure (151) is constructed by successive strata. The flow of binder through the nozzles of the spraying assembly is controlled by the numerical control director (190) according to the nature of the binder, in particular its viscosity and its setting or drying time, to the thickness of the layer of sand, to the nature of the sand and to the motion speed of the spraying assembly along its path. During each passage, one or more nozzles of the spraying assembly are used.

Figure 2:
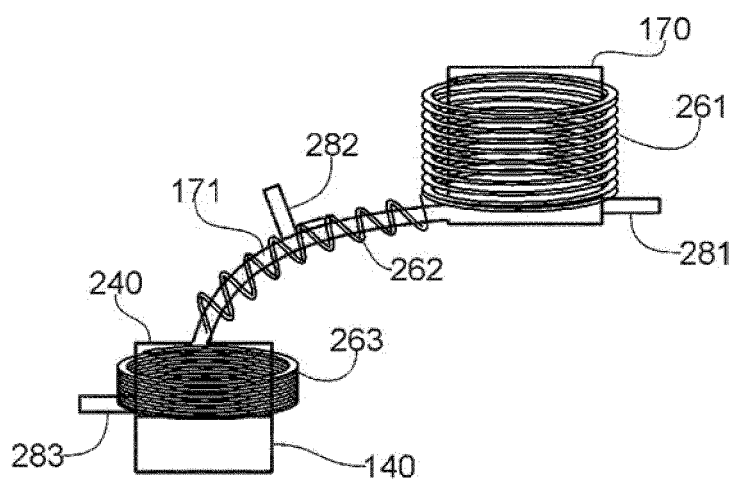
FIG. 2 shows, according to a principle view, an exemplary embodiment of the heating of the inorganic binder before its spraying by the device of the invention.

FIG. 2, in order to control the viscosity of the inorganic binder and in particular to make it compatible with the passage diameters of the nozzles, a heating device is installed between the binder reservoir and the spraying assembly. According to an embodiment, the spraying assembly (140) comprises a buffer reservoir (240) of inorganic binder connected to a main reservoir (170) located inside or outside of the chamber, via a conduit (171).

The device for heating the inorganic binder comprises all or some of the means for heating (261) the binder contained in the main reservoir (170), or heating means (262) acting on the inorganic binder during its passage in the conduit (171) and heating means (263) of the binder contained in the buffer reservoir (240).

Said heating means are regulated so as to set the temperature of the binder in the main reservoir, in the conduit and in the buffer reservoir, according information delivered by temperature sensors (281, 282, 283) measuring the temperature of the binder in the main reservoir (170), in the conduit (171) and in the buffer reservoir (240).

According to exemplary embodiments, the temperature of the binder is uniform from the main reservoir to the spraying assembly, or the binder is progressively heated from the main reservoir until its spraying on the sand bed at the level of the spraying assembly (140).

The heating means (251, 252, 253) are internal or external to the reservoirs or to the conduit, and use individually or in combination, a heating by electrical resistance, by microwaves or by induction, without these examples being limiting.

FIG. 3, the temperature of the binder during its spraying is in particular determined by its viscosity. The latter depends on the nature of the binder, in particular on the nature of the (meta)silicates and of their proportion in the solvent, as well as possible additives.

As an example, the evolution of the dynamic viscosity (302) expressed in Pa·s according to a logarithmic scale, of a sodium silicate solution, is given according to the temperature (301) expressed in ° C., for different concentrations of sodium silicate in water, respectively 34% (311), 28% (312) and 17% (313).

In order to be sprayed by nozzles and in particular to avoid their clogging during spraying, the viscosity of the binder must be less than 0.2 Pa·s. A viscosity which is too low leads to a poor control of the zone affected by the inorganic binder during spraying, said binder being able to be discharged on a zone larger than that targeted during the setting or drying time.

Thus, the viscosity of the binder during spraying is preferably greater than 0.005 Pa·s. These limits, corresponding to the hatched zone of FIG. 3, allow to determine the heating temperature of the binder, according to the concentration of (meta)silicate that it contains.

For a given formulation of the binder, the evolution curve of viscosity is obtained by dynamic viscosity tests according to the temperature. Typically, the heating temperature of the binder is comprised between 30° C. and 100° C.

FIG. 4, the setting or drying time of the zone exposed to the binder is accelerated by the enrichment of the atmosphere of the chamber (110) with $CO_2$, or by the temperature imposed in the chamber. Alternatively or complementarily, according to an embodiment example, the zone exposed to the spraying of the binder is heated by means of a laser beam, directed on said zone immediately after the spraying of binder.

FIG. 4A, according to an embodiment example, the laser beam generator (441) is fixed with respect to the chamber (110) and the beam (401) is directed on the zone by an orientable mirror (442) controlled by the numerical control director (190).

FIG. 4B, according to another embodiment example, the laser beam generator (443) is linked to the spraying assembly (140) and moves with it.

The power of the laser and its interaction time with the zone exposed to the spraying of the binder, are adjusted such that said zone is heated to a temperature comprised between 30° C. and 200° C. This temperature is selected, according to the nature of the sprayed binder, to the composition and to the temperature of the atmosphere in the chamber.

Thus, the device of the invention allows localized, selective and variable heating of the agglomerated zone.

Coming back to FIG. 1, after manufacturing, the agglomerated structure (151) is removed from the sand bed (150) and possibly undergoes complementary drying treatments, by microwaves or in an oven, or also, a curing, aiming to complete its consolidation, without these examples being limiting.

In the case where said structure is intended to constitute a mold, it is inserted in a chassis before its use, in order to confer to it, sufficient mechanical properties to resist the pressures.

The excess sand from the sand bed (150) is recovered and recycled to be used again for the constitution of another structure.

Figure 5:
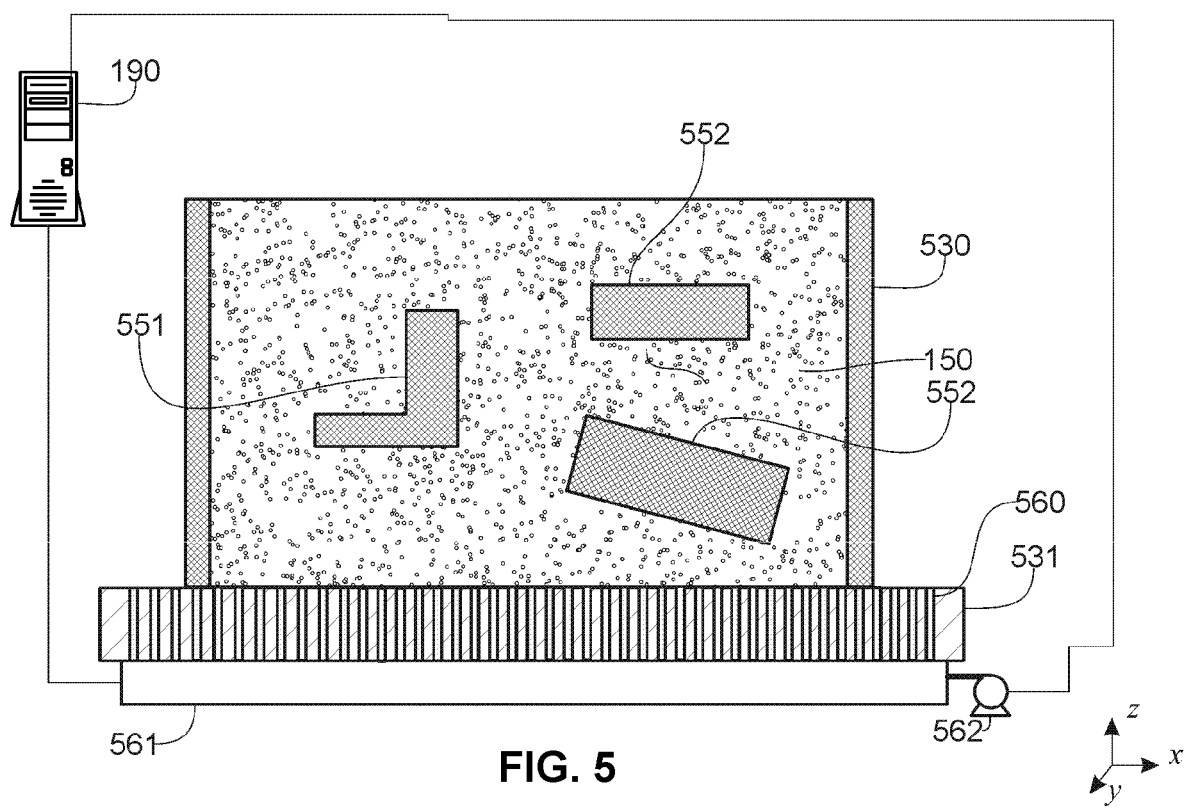
FIG. 5 shows, according to the same cross-section as FIG. 4, an exemplary embodiment of the retention means of the device the invention.

FIG. 5 shows two particular embodiments of the device and of the method of the invention, these two embodiments being separated or combined.

Thus, according to one embodiment, the retention of the sand bed (150) on the table (531) is obtained by the creation of walls (530), which walls are made by selective agglomeration of the sand bed during the additive manufacturing of the structure (551, 552, 553).

According to a second embodiment, the sand bed comprises, from the additive manufacturing, one or more structures (551, 552, 553) extending to variable altitudes in said sand bed.

The localization of these structures in the sand bed (150) and regarding a reference, for example the table (531), is known from the numerical control program used to make said structures by selective agglomeration, such that they can be removed from said non-agglomerated sand bed by an automatic means (not represented) such as a robot or a handler, equipped with an adapted and controlled gripping means, for example, by the numerical control director (190).

The programmed manufacturing conditions of said structures also allow to know the weakest or more resistant zones of them adapted to the gripping of said structures.

However, the non-agglomerated sand surrounding said structures makes this operation difficult with a risk of degrading said structures during their extraction.

In order to simplify this operation and for making it automatable, the device of the invention comprises means allowing to fluidify the non-agglomerated sand bed so as to facilitate the extraction of the structures or to facilitate the removal of said sand, in particular by suctioning means, the two being possibly combined.

To this end, according to an embodiment example, the table (531) comprises on all or some of its surface, a plurality of holes (560) and means (561, 562) for injecting through said holes, a gas in the sand bed, preferably under said sand bed.

The gas injection means are controlled by the numerical control director (190) and comprise, for example, a pump (562) and distribution means (561) allowing to distribute the flow injected between the different holes of the table.

Thus, only some of the holes (560), corresponding to the zones where the fluidification of the sand bed is targeted, is supplied during successive extractions of the agglomerated structures (551, 552, 553).

According to non-limiting embodiment examples, the injected gas is compressed air, $CO_2$ or argon or also a gas mixture according to the nature of the sand.

The flow is adjusted to obtain the effect of fluidification in the targeted zone and in particular according to the thickness of the non-agglomerated layer of sand.

This device is preferably used during the extraction of the structures, after the additive manufacturing phase. It can however also be used during additive manufacturing, with different flows than those used for the extraction, in particular to put the parts of the structure during manufacture in contact with carbon dioxide, in order to accelerate the setting of the inorganic binder.

Figure 6:
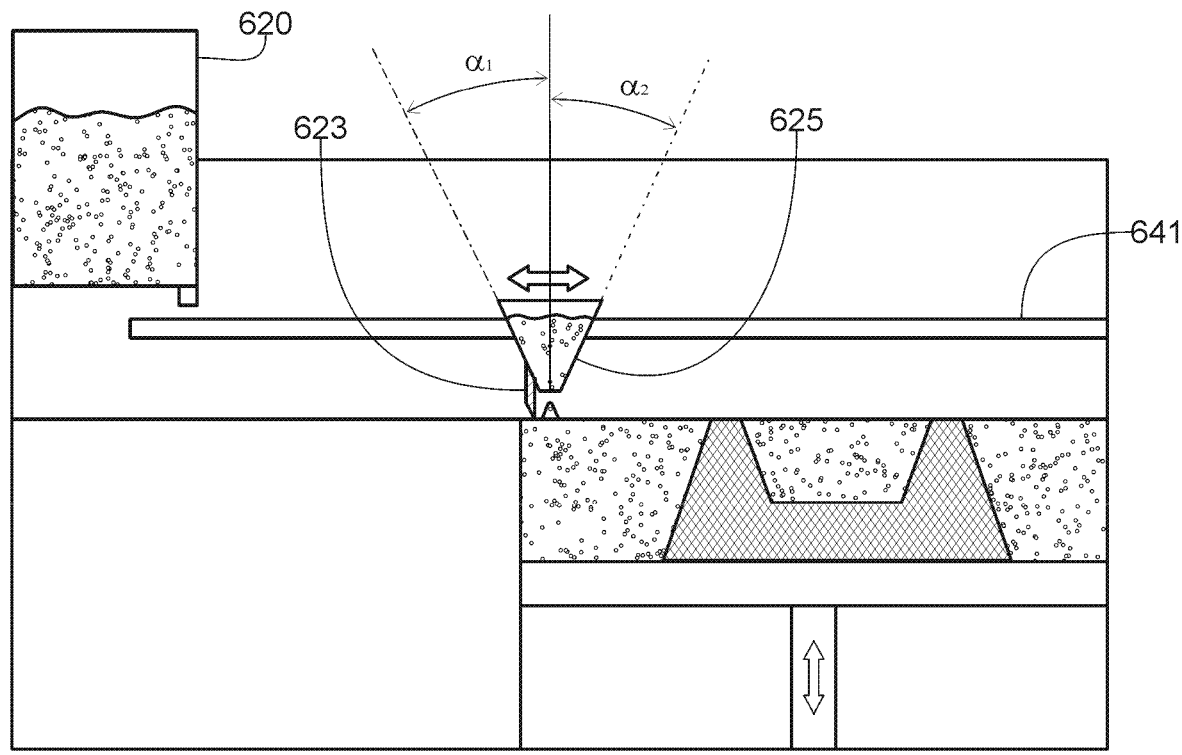
FIG. 6 shows, according to the same view as FIG. 4, an exemplary embodiment of the device which is of the invention using a discharge hopper for the deposition of a granular material; to facilitate reading, FIG. 6 only represents the elements differing with respect to the other embodiments.

FIG. 6, according to an embodiment example of the method and the device of the invention, the deposition of the layer of sand in view of its selective agglomeration is obtained by means of a discharge hopper (625), moved above the sand bed by guiding and motorization means (641), which, according to the embodiment variants, are the same as those ensuring the relative motion of the selective agglomeration device or with separated means. These means are controlled by the numerical control director.

This embodiment allows to simplify the device for depositing the layer of sand. More specifically, it allows to change the nature of the material deposited, potentially during the deposition of each new layer, and thus to vary the characteristics of the part.

To this end, the device of the invention according to this embodiment, comprises one or more reservoirs (620) of granular materials, comprising a distribution system.

Before the deposition of a new layer, the hopper (625) is filled by placing it under one of said reservoirs.

The hopper (625) of the device of the invention does not comprise any dosing or distribution device so as to avoid leaving material in the notches that are usually found in this type of arrangement.

The material is discharged through a free opening at the bottom of the hopper according to a mass flow.

For the mass flow condition of the granular material to be fulfilled, the discharging angle ($\alpha_1+\alpha_2$) of the hopper must be less than or equal to 90°, preferably less than 60°.

Advantageously, the hopper (625) comprises its own scraper (623) to equalize the layer which moves with said hopper.

The quantity of material deposited is adjusted by the surface of the opening at the bottom of the hopper and by the relative motion speed of the hopper with respect to the sand bed during the deposition of the layer.

Figure 7:
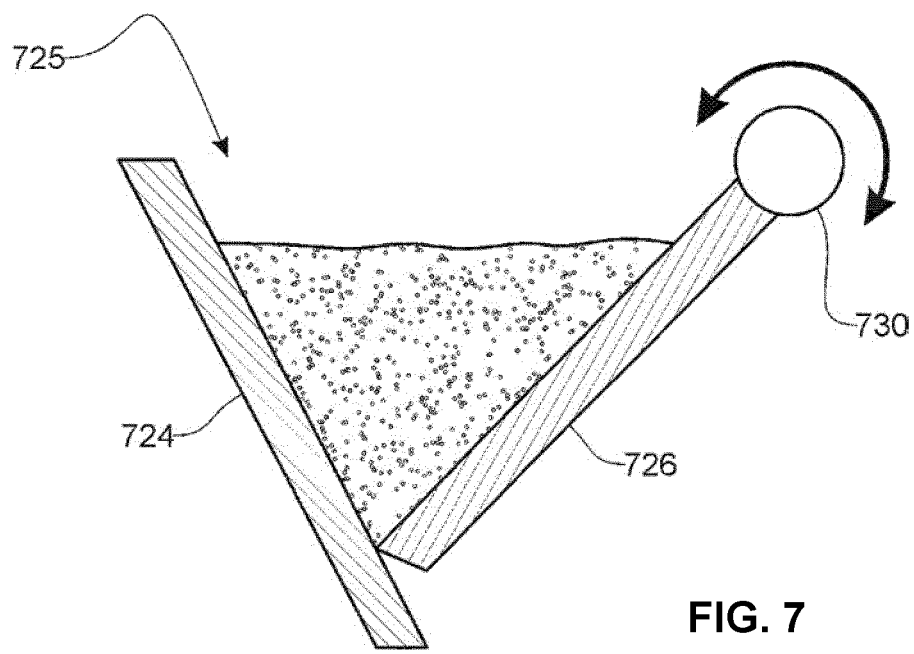
FIG. 7 represents, according to a cross-sectional schematic view, an exemplary embodiment of a hopper with a variable opening.

FIG. 7, according to an embodiment example, in order to obtain a better control of the flow of granular material during the deposition of the layer of material on the sand bed, the hopper (725) of the device of the invention, comprises, according to an exemplary embodiment, a variable discharging opening.

In order to preserve the advantage of the absence of residue from prior depositions, the opening variation is achieved without interposition of any obstacles in said opening, but by moving one or both walls of the hopper.

Thus, according to this embodiment example, one of the walls (726) is moved relative to the other (724) by motorized means (730) controlled by the numerical control director of the device of the invention. This motorized movement allows to close or open more or less the discharging hole of the hopper (725).

Figure 8:
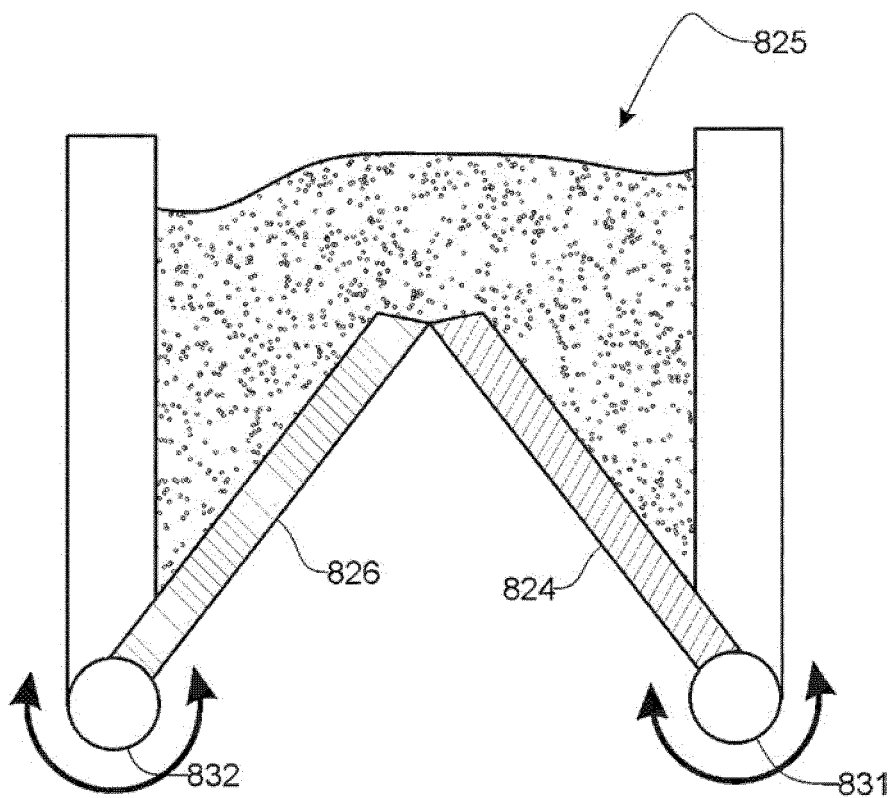
FIG. 8 shows, according to a cross-sectional schematic view, another embodiment example of a hopper with a variable opening.

FIG. 8, according to another embodiment example, the hopper (825) of the device of the invention comprises an inverted shutter opening system. This embodiment allows to lower the load on the shutters (826, 824) and their control motors (831, 832) when the hopper (825) is not in discharging mode.

The description above and the embodiment examples, show that the invention achieves the aim targeted, and allows to agglomerate a granular material in order to obtain a structure by using an inorganic binder. More specifically in manufacturing a mold, the method and the device of the invention allow to achieve this in a reproducible and automated manner, without using a model, with the possibility of integrating the cores, in one single operation. The use of an inorganic binder allows to avoid the disadvantages of the prior art connected to the use of organic resins on the quality of the molded parts and on the possibility of recycling the sand. The method can be adapted to any type of granular material, in particular metallic materials. The mold obtained by the method of the invention is not limited to the implementation of casting operations. The possibilities offered, in particular to locally vary the thermal, electrical, electromagnetic, mechanical, tribological or optical properties of the structure obtained by the method of the invention, also make said structure adapted to the manufacturing of molds intended for the implementation of composite materials with a thermosetting or thermoplastic organic matrix, for operations of curing, consolidation or resin transfer molding, as well as molds for the implementation of the MIM (Metal Injection Molding) method wherein a powder added to a binder is injection molded, the raw part then being de-binded and sintered at a high temperature.

The embodiment examples of the device are given as an illustration. The different motions of the spraying assembly, of the first container, of the retention container, of the scrapers or other transfer means of the sand bed, of the discharge hopper or also of the localized heating laser, are, according to embodiment variants, performed by one or more robots or handlers, of anthropomorphic structure or other, with serial or parallel kinematics, without departing from the scope of the invention.

The invention claimed is:

1. A method for manufacturing a structure from a granular material, the manufacturing comprising an additive manufacturing phase, the method comprising: depositing a layer of sand, the granular material being sand; selectively agglomerating the layer of sand by spraying, by using a spray nozzle, an inorganic binder comprising a $M_2SiO_3$ type (meta)silicate dissolved in a solvent, where M is selected from Na, K and Li individually or in combination, wherein the inorganic binder is heated prior to its spraying to a temperature between 30° C. and 100° C. so as to confer a viscosity less than 0.2 Pa·s to the inorganic binder; and wherein the inorganic binder comprises additives in form of nanoparticles in a colloidal suspension in the organic binder to modify a mechanical or thermal property of the structure.

2. The m of claim 1, wherein the structure is a mold.

3. The method of claim 1, wherein a quantity of the (meta)silicate in the inorganic binder is 5% and 90%.

4. The method of claim 3, wherein the quantity of the (meta)silicate in the inorganic binder is between 10% and 40%.

5. The method of claim 1, wherein M is Na and the proportion of the sodium silicate in the inorganic binder is equal to 30%.

6. The method of claim 1, wherein the solvent is water.

7. The method of claim 1, further comprising drying a zone affected by the spraying of the inorganic binder after selectively agglomerating the layer of sand.

8. The method of claim 7, wherein the drying is performed by heating.

9. The method of claim 7, wherein the drying is performed by putting the zone affected by the spraying of the inorganic binder in contact with $CO_2$.

10. The method of claim 1, wherein the layer of sand is deposited by a hopper moving at a constant speed; and further comprising depositing a layer of second granular material of a characteristic different from the layer of sand.

11. The method of claim 1, further comprising extracting an agglomerated structure from a sand bed, comprising an injection of a gas under the sand bed in order to fluidify a non-agglomerated part of the sand bed after selectively agglomerating the layer of the sand.

\* \* \* \* \*